(12) United States Patent
Tjader

(10) Patent No.: US 12,264,770 B2
(45) Date of Patent: *Apr. 1, 2025

(54) CABLE PULLER AND METHOD

(71) Applicant: TT Technologies, Inc., Aurora, IL (US)

(72) Inventor: Michael Tjader, New Richmond, WI (US)

(73) Assignee: TT Technologies, Inc., Aurora, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/233,576

(22) Filed: Aug. 14, 2023

(65) Prior Publication Data
US 2023/0383890 A1    Nov. 30, 2023

Related U.S. Application Data

(63) Continuation of application No. 17/856,014, filed on Jul. 1, 2022, now Pat. No. 11,725,765, which is a continuation of application No. 17/164,059, filed on Feb. 1, 2021, now Pat. No. 11,378,218, which is a continuation of application No. 16/820,167, filed on Mar. 16, 2020, now Pat. No. 10,927,994, which is a continuation of application No. 16/210,945, filed on
(Continued)

(51) Int. Cl.
| | | |
|---|---|---|
| F16L 55/18 | (2006.01) | |
| B66D 1/00 | (2006.01) | |
| F16L 55/165 | (2006.01) | |
| H02G 1/08 | (2006.01) | |
| F16L 101/50 | (2006.01) | |

(52) U.S. Cl.
CPC ............ *F16L 55/1658* (2013.01); *B66D 1/00* (2013.01); *F16L 55/18* (2013.01); *H02G 1/08* (2013.01); *H02G 1/081* (2013.01); *F16L 2101/50* (2013.01)

(58) Field of Classification Search
CPC .... F16L 55/18; F16L 55/1658; F16L 2101/50
See application file for complete search history.

(56) References Cited

U.S. PATENT DOCUMENTS

| | | |
|---|---|---|
| 5,193,785 A | 3/1993 | Mcvaugh |
| 5,211,509 A | 5/1993 | Roessler |
| (Continued) | | |

FOREIGN PATENT DOCUMENTS

| | | |
|---|---|---|
| CA | 2357722 A1 | 3/2002 |

OTHER PUBLICATIONS

"U.S. Appl. No. 15/273,294, Advisory Action mailed Oct. 31, 2017", 3 pgs.
"U.S. Appl. No. 15/273,294, Final Office Action mailed Aug. 22, 2017", 8 pgs.
"U.S. Appl. No. 15/273,294, Non Final Office Action mailed Feb. 24, 2017", 8 pgs.

(Continued)

*Primary Examiner* — Frederick L Lagman
(74) *Attorney, Agent, or Firm* — Schwegman Lundberg & Woessner, P.A.

(57) ABSTRACT

A cable puller and associated methods are shown. Useful example methods include pipe bursting using cable pullers as shown. Cable pullers and methods shown provide a mechanical advantage that increases an amount of cable pulled in one cycle. Selected examples are shown that include a pulley located on a distal end of a moving portion of an extending and contracting beam. The pulley and the mechanical advantage it supplies helps to improve the efficiency of the cable puller and reduce manufacturing cost of the cable puller.

21 Claims, 6 Drawing Sheets

Related U.S. Application Data

Dec. 5, 2018, now Pat. No. 10,619,783, which is a continuation of application No. 15/273,294, filed on Sep. 22, 2016, now Pat. No. 10,167,986.

(60) Provisional application No. 62/233,875, filed on Sep. 28, 2015.

(56) References Cited

U.S. PATENT DOCUMENTS

| | | | |
|---|---|---|---|
| 5,328,297 | A | 7/1994 | Handford |
| 5,895,176 | A | 4/1999 | Puttman |
| 6,129,486 | A | 10/2000 | Putnam |
| 6,394,701 | B1 | 5/2002 | Delaforce |
| 6,672,802 | B2 | 1/2004 | Putnam |
| 6,799,923 | B2 | 10/2004 | Carter et al. |
| 7,156,585 | B2 | 1/2007 | Wang et al. |
| 7,661,655 | B2 | 2/2010 | Tjader |
| 8,474,795 | B2 | 7/2013 | Tjader |
| 8,702,349 | B2 | 4/2014 | Carter et al. |
| 10,167,986 | B2 | 1/2019 | Tjader |
| 10,619,783 | B2 | 4/2020 | Tjader |
| 10,927,994 | B2 | 2/2021 | Tjader |
| 11,378,218 | B2 | 7/2022 | Tjader |
| 11,725,765 | B2 * | 8/2023 | Tjader .................. F16L 55/18 405/184.3 |
| 2003/0059260 | A1 | 3/2003 | Putnam |
| 2003/0147700 | A1 | 8/2003 | Carter et al. |
| 2004/0146361 | A1 | 7/2004 | Hau |
| 2004/0265067 | A1 | 12/2004 | Putnam |
| 2007/0048090 | A1 | 3/2007 | Wentworth et al. |
| 2008/0069644 | A1 | 3/2008 | Tjader |
| 2014/0037386 | A1 | 2/2014 | Tjader |
| 2016/0348807 | A1 | 12/2016 | Herrick et al. |
| 2017/0089501 | A1 | 3/2017 | Tjader |
| 2018/0045334 | A1 | 2/2018 | Nippes |
| 2019/0170285 | A1 | 6/2019 | Tjader |
| 2020/0217440 | A1 | 7/2020 | Tjader |
| 2021/0107074 | A1 | 4/2021 | Randa et al. |
| 2021/0156505 | A1 | 5/2021 | Tjader |
| 2022/0333727 | A1 | 10/2022 | Tjader |

OTHER PUBLICATIONS

"U.S. Appl. No. 15/273,294, Non Final Office Action mailed Mar. 5, 2018", 9 pgs.

"U.S. Appl. No. 15/273,294, Notice of Allowance mailed Aug. 28, 2018", 5 pgs.

"U.S. Appl. No. 15/273,294, Response filed Oct. 20, 2017 to Final Office Action mailed Aug. 22, 2017", 8 pgs.

"U.S. Appl. No. 15/273,294, Response filed May 24, 2017 to Non-Final Office Action mailed Feb. 24, 2017", 7 pgs.

"U.S. Appl. No. 15/273,294, Response filed Jun. 5, 2018 to Non-Final Office Action mailed Mar. 5, 2018", 7 pgs.

"U.S. Appl. No. 16/210,945, Final Office Action mailed Sep. 16, 2019", 9 pgs.

"U.S. Appl. No. 16/210,945, Non Final Office Action mailed Apr. 5, 2019", 9 pgs.

"U.S. Appl. No. 16/210,945, Notice of Allowance mailed Dec. 12, 2019", 5 pgs.

"U.S. Appl. No. 16/210,945, Response filed Nov. 18, 2019 to Final Office Action mailed Sep. 16, 2019", 6 pgs.

"U.S. Appl. No. 16/210,945, Response filed Jul. 3, 2019 to Non-Final Office Action mailed Apr. 5, 2019", 8 pgs.

"U.S. Appl. No. 16/820,167, Non Final Office Action mailed Jun. 25, 2020", 6 pgs.

"U.S. Appl. No. 16/820,167, Notice of Allowance mailed Oct. 20, 2020", 7 pgs.

"U.S. Appl. No. 16/820,167, Response filed Aug. 25, 2020 to Non Final Office Action mailed Jun. 25, 2020", 7 pgs.

"U.S. Appl. No. 17/164,059, Non Final Office Action mailed Nov. 9, 2021", 8 pgs.

"U.S. Appl. No. 17/164,059, Notice of Allowance mailed Mar. 10, 2022", 7 pgs.

"U.S. Appl. No. 17/164,059, Response filed Feb. 9, 2022 to Non Final Office Action mailed Nov. 9, 2021", 7 pgs.

"U.S. Appl. No. 17/856,014, Non Final Office Action mailed Sep. 23, 2022", 7 pgs.

"U.S. Appl. No. 17/856,014, Notice of Allowance mailed Mar. 27, 2023", 9 pgs.

"U.S. Appl. No. 17/856,014, Response filed Jan. 23, 2023 to Non Final Office Action mailed Sep. 23, 2022", 8 pgs.

* cited by examiner

CABLE PULLER AND METHOD

CLAIM OF PRIORITY

This application is a continuation and claims priority to U.S. patent application Ser. No. 17/856,014, filed Jul. 1, 2022, issued Aug. 15, 2023 as U.S. Pat. No. 11,725,765, entitled "CABLE PULLER AND METHOD", which is a continuation and claims priority to U.S. patent application Ser. No. 17/164,059, filed Feb. 1, 2021, issued Jul. 5, 2022 as U.S. Pat. No. 11,378,218, entitled "CABLE PULLER AND METHOD", which is a continuation and claims priority to U.S. patent application Ser. No. 16/820,167, filed Mar. 16, 2020, issued Feb. 23, 2021 as U.S. Pat. No. 10,927,994, entitled "CABLE PULLER AND METHOD", which is a continuation and claims priority to U.S. patent application Ser. No. 16/210,945, filed Dec. 5, 2018, issued Apr. 14, 2020 as U.S. Pat. No. 10,619,783, entitled "CABLE PULLER AND METHOD", which is a continuation of and claims priority to U.S. patent application Ser. No. 15/273,294 filed on Sep. 22, 2016, issued Jan. 1, 2019 as U.S. Pat. No. 10,167,986, entitled "CABLE PULLER AND METHOD", which claims the benefit of priority to U.S. Provisional Application Ser. No. 62/233,875, filed on Sep. 28, 2015, the benefit of priority of each of which is claimed hereby, and each of which are incorporated by reference herein in its entirety.

TECHNICAL FIELD

Embodiments described herein generally relate to cable pulling. Specific examples may include pipe bursting or pipe splitting using cyclic cable pullers.

BACKGROUND

Trenchless pipe replacement is useful for replacement of pipes or other buried conduits without the need to excavate the length of pipe to be replaced. An example of trenchless pipe replacement includes pulling a cutting blade with an expander through the pipe to be replaced, and attaching a new pipe behind the cutting blade. The pipe to be replaced is split, and pushed into the surrounding soil, and the new pipe, of equal or larger diameter, is pulled into the new space within the split pipe. Splitters are commonly used for small diameter pipes, and for pipes of a material that lends itself to splitting. Another example of trenchless pipe replacement includes pipe bursting.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
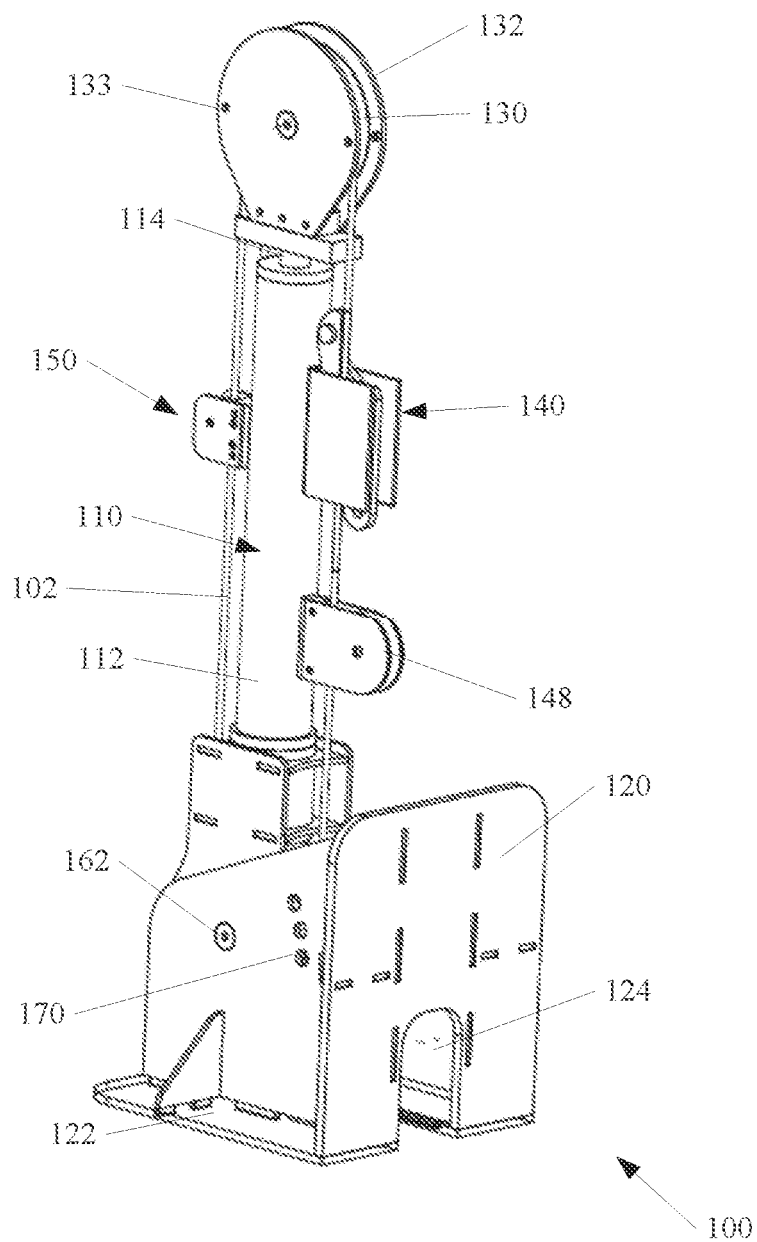
FIG. 1 is a perspective view of a cable puller in accordance with some embodiments of the invention.

FIG. 1 shows a cable puller 100 according to an example of the invention. An extending and contracting beam 110 is shown, including a stationary portion 112 and a moving portion 114. In one example, the extending and contracting beam 110 includes a hydraulic cylinder. In one example, the extending and contracting beam 110 is composed solely of a hydraulic cylinder, and no other supporting structure is used. Although a hydraulic cylinder is used as an example, other extending and contracting devices may be used, such as an electric motor driven extender, etc. A portion of a cable 102 is shown within the cable puller 100 to aid in description of other components of the cable puller 100 and their functions.

A soil reaction plate 120 is further shown coupled to an end of the extending and contracting beam 110. In the example shown, a second soil reaction plate 122 is shown coupled at approximately 90 degrees to the soil reaction plate 120. In one example, a pair or orthogonal reaction plates 120, 122 may be useful to abut against a side and a bottom of an exit pit in a pipe bursting or pipe removal application. Although two reaction plates are shown in FIG. 1, the invention is not so limited. Other examples may include a single reaction plate, or no reaction plate at all. In some examples a reaction plate may be a separate component from the cable puller.

In the example shown, the soil reaction plate 120 includes a slot 124 the slot 124 is configured to allow the reaction plate 120 and in some examples the second reaction plate 122 to be sideways mounted onto a cable that may already be located within a pipe to be burst, with the cable 102 lying within an exit pit. In one example, the slot 124 is large enough to accept a bursting head. More details of this example are discussed in examples below with respect to FIGS. 4 and 5.

A pulley 130 is shown coupled to an end of the extending and contracting beam 110 opposite from the reaction plate 120, or otherwise opposite a location where a cable will exit the ground during a bursting or removal operation. In the example shown, a pair of plates 132 are included to provide improved guidance to the cable being pulled, and to protect a user from exposed rotating portions of the pulley 130. In one example, a bolt or other retainer may be inserted or through holes 133 to further capture the cable 102 being pulled during an operation.

A cable gripping device 140 is shown coupled to the stationary portion 114 of the extending and contracting beam 110. More details of the cable gripping device 140 are discussed below with respect to FIGS. 2A and 2B. In one example, a guide pulley 148 is located adjacent to the cable gripping device 140. The guide pulley 148 may be used to pull a loose end easily away from the cable puller 100 as the cable 102 exits the cable puller 100. An operator may stand at a distance of a number of feet away from the cable puller 100, and the guide pulley 148 easily keeps the loose cable 102 from becoming tangled as the cable puller 100 cycles through a number of strokes.

In operation, the moving end 114 of the extending and contracting beam 110 is cycled back and forth to pull the cable 102 in a series of strokes. The cable gripping device 140 engages and releases the cable 102 between successive strokes of the extending and contracting beam 110. The pulley 130 provides a mechanical advantage to the extending and contracting beam 110. Specifically, because the extending and contracting beam 110 lengthens a portion of cable 102 on both sides of the extending and contracting beam 110 the mechanical advantage of the pulley doubles an amount of cable pulled in one cycle.

This can be useful in cable pulling, especially over long distance pulls. If an amount of cable pulled in a single cycle is too short, the cable may merely stretch out and spring back in each cycle, and a bursting or splitting head may not move within the pipe to be burst at all. By using a heavier rated hydraulic cylinder, and doubling the amount of cable pulled for each stroke, the above detailed problem is avoided entirely, or greatly reduced.

Some cyclic cable pulling systems have employed the use of both a pulling cable gripping device, and a holding cable gripping device to hold the cable in tension while the pulling cable gripping device cycles back for another stroke. By using configurations of the present invention, an amount of cable pulled for each stroke is doubled. As a result, in some examples, only a single cable gripping device is needed, because some amount of cable stretch can be accommodated with such a long amount of cable being pulled for each stroke.

Using only one cable gripping device simplifies the cable puller 100 and reduces the cost of the machine. By doubling the amount of cable pulled for each stroke, a bursting operation can performed much faster than with a shorter stroke cyclic puller.

In one example, a splitter 150 is attached to the stationary portion before the cable gripper. More details of the splitter 150 are discussed below with respect to FIGS. 3A-3C.

In one example, a pivot 162 is included to allow the extending and contracting beam 110 to be oriented within a range of angles with respect to the soil reaction plate 120. In one example, the pivot 162 works in conjunction with a number of selector holes 170 and pins (not shown).

Figure 2A:
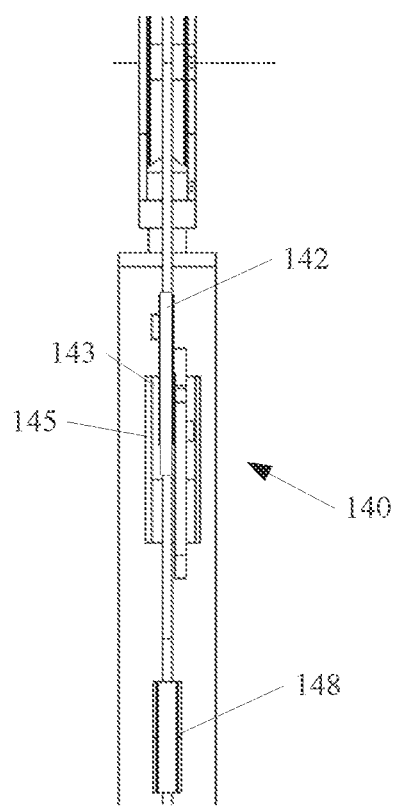
FIG. 2A is a side view of a gripping device in accordance with some embodiments of the invention.
Figure 2B:
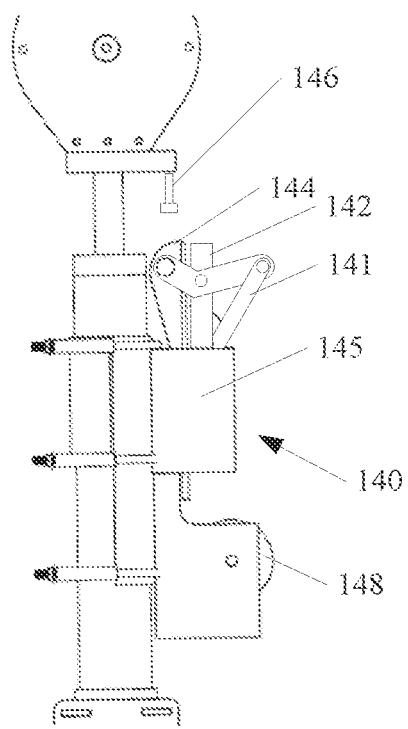
FIG. 2B is another side view of the gripping device from FIG. 2A in accordance with some embodiments of the invention.

FIGS. 2A and 2B show close up views of an example of a cable gripping device 140. A first jaw 142 and a second jaw 144 are located opposite one another, with a linkage mechanism 141 to apply a gripping force to a cable. In one example, the linkage mechanism 141 is actuated by friction in the cable, which pulls the second jaw 144 tight onto the cable. In one example, a release trigger 146 is included on a portion of the cable puller 100, and positioned to bump into the second jaw 144 at the end of a contracting stroke of the extending and contracting beam 110. In this way, the cable will be released, and the slack may be pulled tight by an operator, who may pull the slack cable over the guide pulley 148, and away from the cable puller 100.

FIG. 2A shows a pair of plates 145 that may be included in select examples to protect from moving parts of the cable gripping device 140 during operation. In one example the cable gripping device 140 may be configured to be capable of side loading. A space 143 is located between the first jaw 142 and a side plate 145. In use, an operator may insert a side surface of a cable into the space 143, and then laterally between the first jaw 142 and the second jaw 144. In many cases, it is convenient to be able to side load a cable onto the cable puller 100 and into the cable gripping device 140. As discussed above, cables may be first pulled through a pipe to be replaced, and the cable puller 100 may be dropped into an exit pit after the cable is already there. In such a case, it is desirable to be able to side load a cable into one or more components of the cable puller 100.

Figures 3A, 3B:
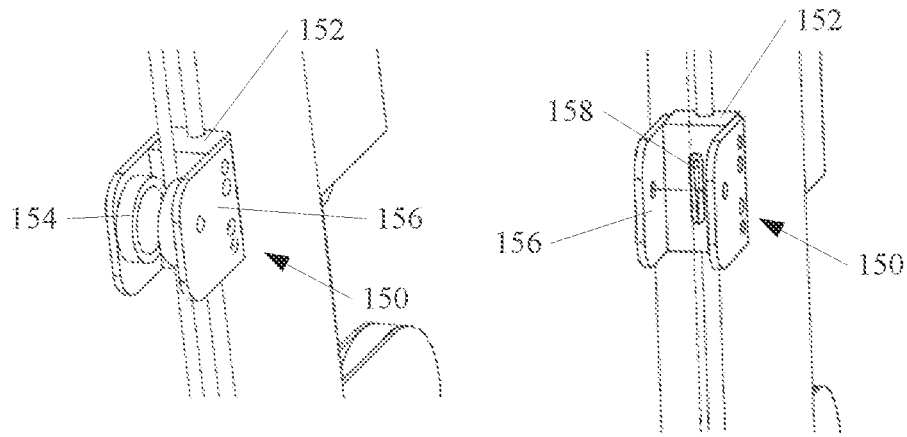
FIG. 3A is a perspective view of a splitter in accordance with some embodiments of the invention.
FIG. 3B is another perspective view of the splitter from FIG. 3A in accordance with some embodiments of the invention.
Figure 3C:
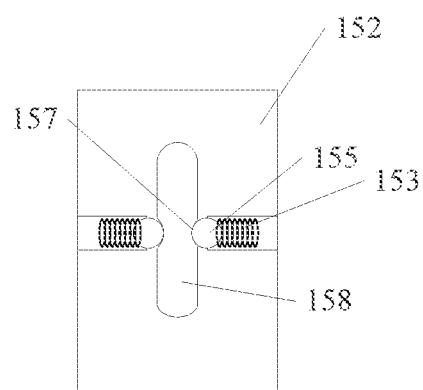
FIG. 3C is cross section diagram view of the splitter from FIGS. 3A and 3B in accordance with some embodiments of the invention.

FIGS. 3A-3C show an example of a splitter that may be included in one embodiment of the invention. FIG. 3A shows a splitter base 152 and a pulley 154 located opposite the splitter base 152. A pair of side plates 156 are included to hold the pulley 154 in place.

In an operation such as pipe bursting or splitting, a pipe that is being burst may instead start to be pulled out of the ground with the cable still located inside the pipe. This may be undesirable, as the pipe may foul up the working of components of the cable puller 100 such as the pulley 130 or the cable gripping device 140.

FIG. 3B shows a blade 158 that is located in the path of a pipe that may be undesirably pulled out of the ground. The blade 158 splits the pipe as it is pulled into the cable puller 100, and the spit pipe may be more easily removed from the cable puller 100 before it fouls up any downstream components. In the example shown, the blade 258 is a stationary blade, however, other examples such as a wheel cutter may be used.

In one example, the blade 158 is replaceable, such as if the blade 158 becomes worn. In the example shown, the blade 158 is formed on a base that slides down into a slot in the splitter base 152. In one example, the blade 158 is held in place in the slot by one or more spring loaded balls that correspond to a detent. FIG. 3C shows a ball 155 being biased by a spring 153. The ball 155 is thereby urged into a detent 157 on the base of the blade 158. In one example, if a blade 158 is to be replaced, a screwdriver or other tool may be wedged from underneath the blade 158 or the splitter base 152 to dislodge the ball 155 from the detent 157. In other examples, the blade 158 may be gripped with pliers and pulled out with force sufficient to overcome the ball 155 and detent 157. Although a replaceable blade 158 is shown, other example of splitters 150 may not include replaceable blades 158.

Figure 4:
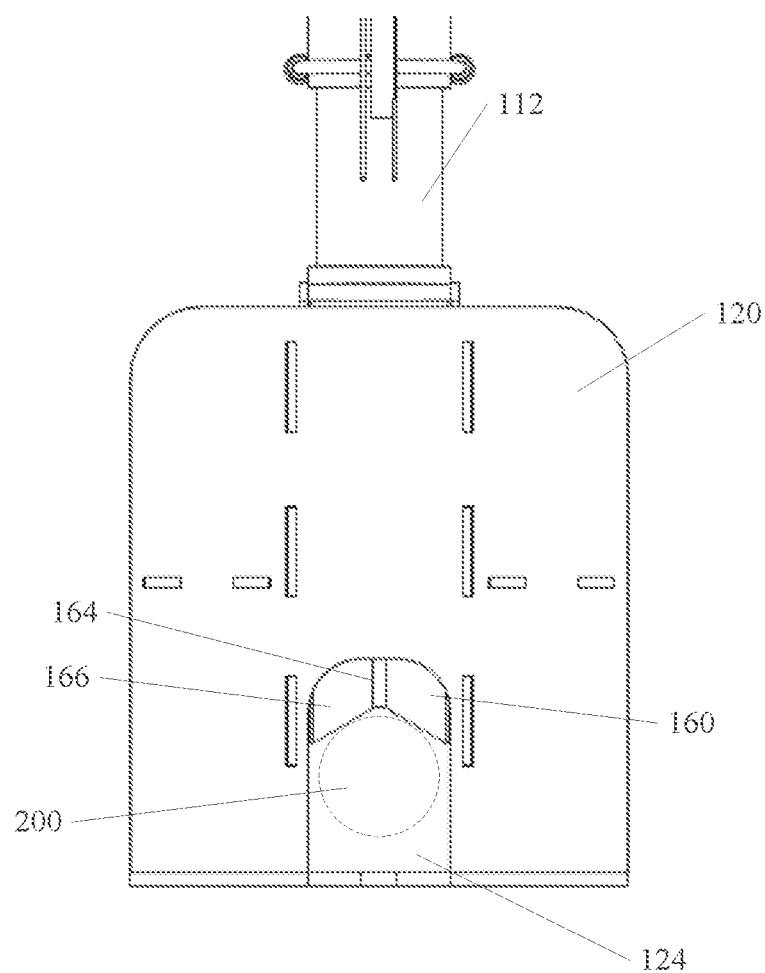
FIG. 4 is an end view of a portion of a cable puller in accordance with some embodiments of the invention.

FIG. 4 shows a front view of the soil reaction plate 120. A pulley 160 is shown attached to the stationary portion 112 adjacent to the soil reaction plate 120. In the example shown, the pulley 160 includes an inner groove 164 sized for a cable to be pulled, and an outer surface 166 to guide a bursting head 200 around the pulley 160. In the example shown, the soil reaction plate 120 includes a slot 124 large enough to accept a bursting head 200.

In operation, it is difficult to remove a bursting head from an end of the new pipe that is being pulled into the soil after the old pipe is burst or split. It is much easier to remove the bursting head from the end of the new pipe, if the bursting head is pulled a larger distance into the exit pit before ending the pull. By having a slot 124 large enough to accept a bursting head 200, and an outer surface 166 to guide a bursting head 200 around the pulley 160, the bursting head can be pulled past the soil reaction plate 120, and further into the exit pit, to better facilitate the removal of the bursting head, and still have a large amount of new pipe extending into the exit pit with which to work on.

Figure 5:
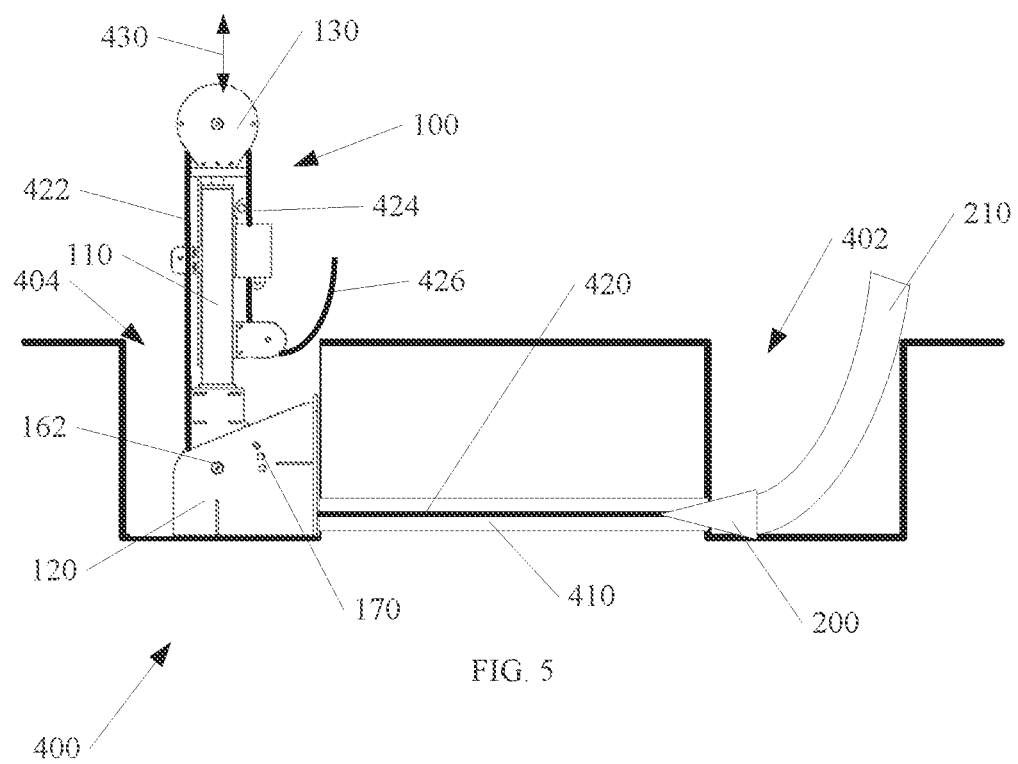
FIG. 5 is a side view of a cable puller in use in accordance with some embodiments of the invention.

FIG. 5 shows a diagram view of an example operation using a cable puller 100 as described in examples above. An entry pit 402 and an exit pit 404 are shown. A pipe to be replaced 410 is shown, and a new pipe 210 is being pulled in to replace the pipe to be replaced 410. A bursting head 200 is shown coupled to a cable 420 and to the new pipe 210.

An example of a cable puller 100 is shown located in the exit pit 404. As described above, the extending and contracting beam 110 moves as indicated by arrows 430, and pulls the cable 420 over the pulley 130 at the top of the extending and contracting beam 110. As described above, a first portion of cable 422 and a second portion of cable 424 are both lengthened by the motion 430 of the pulley 130 and the extending and contracting beam 110. This feature doubles the amount of cable pulled in each stroke. A loose end 426 of the cable may be pulled out of the way of the cable puller 100 by a user between cycles.

Figure 6:
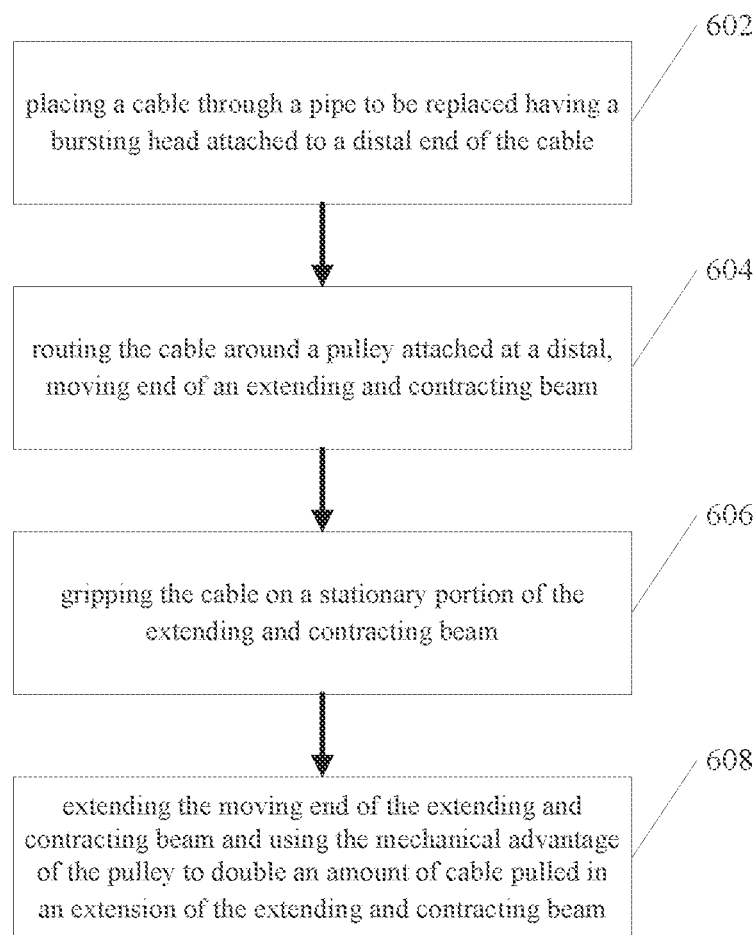
FIG. 6 is a flow diagram of a method of operating a cable puller in accordance with some embodiments of the invention.

FIG. 6 shows one example method of operating a cable puller as shown in FIG. 5. In operation 602, a cable is placed through a pipe to be replaced having a bursting head attached to a distal end of the cable. In operation 604, the cable is routed around a pulley attached at a distal, moving end of an extending and contracting beam. In operation 606, the cable is gripped on a stationary portion of the extending and contracting beam, and in operation 608. the moving end of the extending and contracting beam is extended. The mechanical advantage of the pulley is used to double an amount of cable pulled in an extension of the extending and contracting beam.

To better illustrate the method and apparatuses disclosed herein, a non-limiting list of examples is provided here:

Example 1 includes cable puller, including an extending and contracting beam, including a stationary portion and a moving portion, a soil reaction plate coupled to the stationary portion, a pulley attached at a distal end of the moving portion, and a cable gripping device attached to the stationary portion.

Example 2 includes the cable puller of example 1, wherein the extending and contracting beam includes a hydraulic cylinder to power the extending and contracting beam.

Example 3 includes the cable puller of any one of examples 1-2, wherein the extending and contracting beam is a hydraulic cylinder.

Example 4 includes the cable puller of any one of examples 1-3, further including a guide pulley located adjacent to the cable gripping device.

Example 5 includes the cable puller of any one of examples 1-4, wherein the soil reaction plate includes a slot large enough to accept a bursting head.

Example 6 includes the cable puller of any one of examples 1-5, wherein the soil reaction plate includes a vertical and horizontal reaction plate portion.

Example 7 includes the cable puller of any one of examples 1-6, wherein the cable gripper is capable of side loading.

Example 8 includes the cable puller of any one of examples 1-7, further including a splitter attached to the stationary portion before the cable gripper.

Example 9 includes the cable puller of any one of examples 1-8, wherein the splitter includes a stationary blade that is replaceable.

Example 10 includes the cable puller of any one of examples 1-9, wherein the stationary blade is held in place with one or more spring loaded balls that correspond to a detent.

Example 11 includes 1 cable puller including an extending and contracting beam, including a stationary portion and a moving portion, a soil reaction plate coupled to the stationary portion, a first pulley attached to the stationary portion adjacent to the soil reaction plate, a second pulley attached at a distal end of the moving portion, and a cable gripping device attached to the stationary portion.

Example 12 includes the cable puller of example 11, further including an actuator to disengage the cable gripping device during a cycle of the extending and contracting beam.

Example 13 includes the cable puller of any one of examples 11-12, wherein the extending and contracting beam is a hydraulic cylinder.

Example 14 includes the cable puller of any one of examples 11-13, wherein a beam angle with respect to the soil reaction plate is adjustable.

Example 15 includes the cable puller of any one of examples 11-14, wherein the first pulley includes an inner groove sized for a cable to be pulled, and an outer surface to guide a bursting head around the first pulley.

Example 16 includes the cable puller of any one of examples 11-15, wherein the soil reaction plate includes a slot large enough to accept a bursting head.

Example 17 includes a method, including placing a cable through a pipe to be replaced having a bursting head attached to a distal end of the cable, routing the cable around a pulley attached at a distal, moving end of an extending and contracting beam, gripping the cable on a stationary portion of the extending and contracting beam, and extending the moving end of the extending and contracting beam and using the mechanical advantage of the pulley to double an amount of cable pulled in an extension of the extending and contracting beam.

Example 18 include the method of example 17, further including routing the cable around a stationary pulley located on the stationary portion of the extending and contracting beam and pulling the cable at an angle upwards out of an exit pit.

Example 19 includes the method of any one of examples 17-18, further including pulling the bursting head out of the ground at an end of a run, and through an opening in a reaction plate.

Example 20 includes the method of any one of examples 17-19, wherein pulling the bursting head out of the ground at an end of a run includes pulling the bursting head through the opening in the reaction plate and around at least a portion of the stationary pulley.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A cable pulling system, comprising:
   a cable pulling device, including:
   an extending and contracting beam including a first end portion and a second end portion;
   a pulley attached at a distal end of the first end portion, such that when in operation, the pulley moves back and forth as the beam extends and contracts; and
   a cyclic cable gripper attached to the extending and contracting beam, wherein the cyclic cable gripper is configured to pull a cable through a length of pipe by gripping the cable on a beam extension, and automatically releasing the cable on a beam contraction.

2. The cable pulling system of claim 1, wherein the extending and contracting beam includes a hydraulic cylinder to power the extending and contracting beam.

3. The cable pulling system of claim 1, wherein the extending and contracting beam is formed from at least one hydraulic cylinder.

4. The cable pulling system of claim 1, wherein the cyclic cable gripper is configured to accept side loading of a cable.

5. The cable pulling system of claim 1, further including a second pulley located along an intermediate portion of the extending and contracting beam to guide a loose end of the cable.

6. The cable pulling system of claim 1, further including a soil reaction plate coupled to the second end portion.

7. The cable pulling system of claim 6, further including a pivot located at the second end portion of the extending and contracting beam.

8. The cable pulling system of claim 7, wherein the soil reaction plate includes a slot large enough to accept a bursting head.

9. The cable pulling system of claim 7, wherein the soil reaction plate includes a vertical and horizontal reaction plate portion.

10. A cable pulling system, comprising:
    a cable pulling device, including:
    an extending and contracting beam including a first end portion and a second end portion;
    a pulley attached at a distal end of the first end portion, such that when in operation, the pulley moves back and forth as the beam extends and contracts;
    a single cyclic cable gripper attached to an end of the extending and contracting beam, wherein the single cyclic cable gripper is configured to pull a cable through a length of pipe by gripping the cable on a beam extension, and releasing the cable on a beam contraction;
    a bursting head; and
    a cable coupled between a front end of the bursting head and the cable pulling device.

11. The cable pulling system of claim 10, wherein the extending and contracting beam includes a hydraulic cylinder to power the extending and contracting beam.

12. The cable pulling system of claim 10, wherein the extending and contracting beam is formed from at least one hydraulic cylinder.

13. The cable pulling system of claim 10, wherein the cyclic cable gripper is configured to accept side loading of a cable.

14. The cable pulling system of claim 10, further including a second pulley located along an intermediate portion of the extending and contracting beam to guide a loose end of the cable.

15. The cable pulling system of claim 10, further including a soil reaction plate coupled to the second end portion.

16. The cable pulling system of claim 15, further including a pivot located at the second end portion of the extending and contracting beam.

17. A method of pipe replacement, comprising:
    placing a cable through a pipe to be replaced;
    coupling a splitter head to a distal end of the cable;
    routing the cable through a frame and around a stationary base pulley;
    routing the cable over a pulley located at a distal, moving end of an extending and contracting beam;
    gripping the cable with a cyclic cable gripper attached to the extending and contracting beam;
    extending a moving end of the extending and contracting beam to pull the cable; and
    pulling the splitter head through the pipe to be replaced.

18. The method of claim 17, further including routing the cable around a stationary pulley located on a stationary side of the extending and contracting beam to guide a loose end of the cable.

19. The method of claim 17, further including pulling the splitter head out of the ground at an end of a run, and through an opening in a reaction plate.

20. The method of claim 17, wherein extending a moving end of the extending and contracting beam includes extending a moving end of at least one hydraulic cylinder.

21. The method of claim 17, wherein gripping the cable includes side loading the cable into the cyclic cable gripper.

* * * * *